(12) United States Patent
Hariharan et al.

(10) Patent No.: US 11,133,804 B1
(45) Date of Patent: Sep. 28, 2021

(54) STACKABLE TIMER

(71) Applicant: TEXAS INSTRUMENTS INCORPORATED, Dallas, TX (US)

(72) Inventors: Rakesh Hariharan, Bangalore (IN); Sumantha Manoor Madhyastha, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 17/127,167

(22) Filed: Dec. 18, 2020

(51) Int. Cl.
*H03K 19/177* (2020.01)
*G06F 1/08* (2006.01)
*H03K 21/08* (2006.01)
*G06F 115/02* (2020.01)

(52) U.S. Cl.
CPC .............. *H03K 19/177* (2013.01); *G06F 1/08* (2013.01); *H03K 21/08* (2013.01); *G06F 2115/02* (2020.01)

(58) Field of Classification Search
CPC ........ H03K 19/177; H03K 21/08; G06F 1/08; G06F 2115/02

USPC ......................................................... 327/564
See application file for complete search history.

(56) References Cited

U.S. PATENT DOCUMENTS

2021/0159688 A1* 5/2021 Lassen ................. H02H 1/0092

\* cited by examiner

*Primary Examiner* — Tomi Skibinski
(74) *Attorney, Agent, or Firm* — Charles F. Koch; Charles A. Brill; Frank D. Cimino

(57) ABSTRACT

An system-on-a-chip ("SoC") is provided. In some examples, the SoC includes a processor and a plurality of timer circuit blocks including at least a first timer circuit block and a second timer circuit block. Each of the plurality of timer circuit blocks may be selectively coupled by at least one of a first programmable matrix and a second programmable matrix. In some examples, the first programmable matrix may be configured to couple a second trigger input of the first timer circuit block with a first trigger output of the second timer circuit block. In some examples, the second programmable matrix is configured to couple a second fault input of the first timer circuit block with a first fault output of the second timer circuit block.

20 Claims, 4 Drawing Sheets

STACKABLE TIMER

BACKGROUND

A system-on-a-chip ("SoC") may include a wide variety of electronic circuits, sub-systems, and other components to perform various functions. To build the SoC and the included circuits, sub-systems, and other components in order to perform various functions, a number of different intellectual property ("IP") cores (or IP blocks) for the different circuits, sub-systems, and other components may be used. An IP core references a reusable unit of logic, cell, or integrated circuit (sometimes referred to as a "chip") layout and design, and an IP core gets its name because it may refer to information that is the legal Intellectual Property of a particular party. In the context of this disclosure, an IP core will refer to the logic and/or metadata associated with design specifications of a chip or SoC. An IP core or IP block may be "soft IP" or "hard IP." In the context of this disclosure, an IP block that is "soft IP" may refer to the software implementation of the IP block, such as a Verilog or VHDL functional model that can go through the synthesis and implementation flows of the IP consumer to generate a physical product. In the context of this disclosure, an IP block that is "hard IP" may refer to the physical hardware implementation of the IP block, such as the combination of transistors that performs the desired function of the IP block. For example, a hard IP circuit block may comprise a circuit in a SoC.

IP blocks may be combined to build the desired functionality for an SoC application. Given the increasing complexity of SoCs, it is difficult and/or inefficient for a single source to supply or develop all the required IP blocks for a particular SoC. Thus, many SoC developers seek to license the needed IP blocks from other sources. As a result, a market for IP blocks has developed in which developers offer a catalog of various IP blocks for numerous functionality that can be licensed.

One useful IP block is that for timer circuits that may be used to form timer devices. Timer devices can be used for many applications including pulse width modulation, counting, triggering, and capture-compare functionality. Capture-compare may refer to two modes of operation: capture mode and compare mode. Capture mode of a timer enables, for example, the timer to store the current value to a capture-compare register when a specific event occurs such as a transition on a capture-compare pin. Capture mode enables, for example, measurement of time intervals of external events picked up by the capture-compare pin. Compare mode may continually compare the value in the capture-compare register with a control value such as a current time value, and then the timer may trigger an interrupt or a transition on the capture-compare pin when the value in the register matches the control value. Compare mode enables, for example, the generation of regular time intervals in hardware (without software). Regular time intervals can be used to generate a signal, such as a pulse width modulated ("PWM") signal, on the capture-compare pin or to start actions in other peripherals.

Because of the broad range of applications for timer devices, the size and functionality of timer circuits varies greatly. Many SoCs require numerous timers of varying size and capabilities. For example, a SoC application may need a timer with two capture-compare channels in one circuit, and in another circuit on the SoC, there may be a need for a timer with eight capture-compare channels. To accommodate these situations, an IP provider may offer two timer IP blocks: one with two capture-compare channels and one with eight capture-compare channels. However, in yet another circuit on the SoC, there may be a need for a timer with six capture-compare channels. In this case, the timer IP block with eight capture-compare channels would need to be used, or the licensor would need to develop yet another IP block with six capture-compare channels to satisfy this need.

Use of a timer that is larger than necessary inefficiently utilizes resources on the SoC. Conversely, using a timer that is smaller than desired may limit the capabilities of the SoC.

Furthermore, circuitry needs to be tested and verified, and a SoC using a variety of different timer IP blocks may need to test and verify each of the different IP blocks.

SUMMARY

In some examples, a SoC includes a stackable base timer circuit (also referred to herein as a timer circuit block or timer device) that may be combined with one or more additional stackable base timer circuits to form a timer with increased capabilities (e.g., increased capture-compare channels). Multiple instances of the stackable base timer circuit may be combined with a programmable trigger matrix to create the desired timer. In some examples, one of the stackable base timer circuits may be configured as the primary timer and the other stackable base timer circuits coupled to the primary timer by a cross-trigger matrix may be configured as secondary timers to the primary timer. In some examples, a device fault signal received by the primary timer will be communicated to the secondary timers over a programmable fault cross-trigger matrix between the primary and secondary timers.

In some examples, a SoC comprises a processor and a plurality of timer circuit blocks including at least a first timer circuit block and a second timer circuit block. Each of the plurality of timer circuit blocks is selectively coupled by at least one of a first programmable matrix and a second programmable matrix. In some examples, the first programmable matrix is configured to couple a second trigger input of the first timer circuit block with a first trigger output of the second timer circuit block. In some examples, the second programmable matrix is configured to couple a second fault input of the first timer circuit block with a first fault output of the second timer circuit block.

In some examples, an integrated circuit includes a first timer device with a first plurality of trigger inputs, a first plurality of trigger outputs, a first plurality of fault trigger inputs, and a first plurality of fault trigger outputs. The integrated circuit includes a second timer device with a second plurality of trigger inputs, a second plurality of trigger outputs, a second plurality of fault trigger inputs, and a second plurality of fault trigger outputs. A trigger output of the first plurality of trigger outputs is coupled to a trigger input of the second plurality of trigger inputs. A trigger output of the second plurality of trigger outputs is coupled to a trigger input of the first plurality of trigger inputs. A fault trigger output of the first plurality of fault trigger outputs is coupled to a fault trigger input of the second plurality of fault trigger inputs. A fault trigger output of the second plurality of fault trigger outputs is coupled to a fault trigger input of the first plurality of fault trigger inputs.

In some examples, at least one non-transitory computer readable medium includes instructions that stack a first timer circuit block with a second timer circuit block on a system-on-a-chip. When executed, the instructions configure a first matrix to couple a second of a plurality of trigger inputs of a first timer circuit block with a first of a plurality of trigger outputs of a second timer circuit block; and couple a first of the plurality of trigger inputs of the second timer circuit block with a second of the plurality of trigger outputs of the first timer circuit block. When executed, the instructions configure a second matrix to couple a second of a plurality of fault inputs of the first timer circuit block with a first of a plurality of fault outputs of the second timer circuit block; and couple a first of the plurality of fault inputs of the second timer circuit block with a second of the fault outputs of the first timer circuit block.

BRIEF DESCRIPTION OF THE DRAWINGS

Features of the present invention may be understood from the following detailed description and the accompanying drawings.

DETAILED DESCRIPTION

Figure 1:
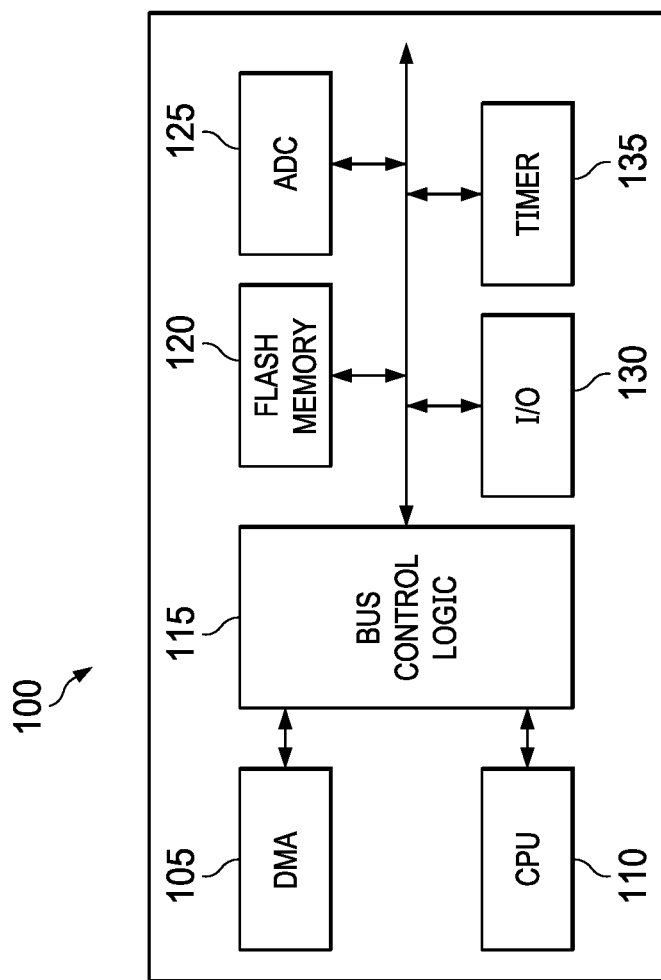
FIG. 1 is a block diagram of an exemplary SoC.

Specific examples are described below in detail with reference to the accompanying figures. It is understood that these examples are not intended to be limiting, and unless otherwise noted, no feature is required for any particular example.

An example base timer circuit block may be stacked (or coupled) with one or more additional base timer circuit blocks to function as a larger single timer circuit block by coupling the base timer circuit blocks together with a cross-trigger matrix and a fault-trigger matrix. The cross-trigger matrix and the fault-trigger matrix are programmable and may be configured to enable at least two base timer circuit blocks to function as a single timer. The combined single timer circuit block may comprise the combined functionality of the number of combined base timer circuit blocks. For example, if each base timer circuit block includes two capture-compare channels, then stacking two base timer circuit blocks may result in a single timer circuit block having four capture-compare channels. Each base timer circuit block includes one or more trigger inputs and outputs as well as one or more fault trigger inputs and outputs.

The cross-trigger matrix may be formed by selectively coupling the one or more trigger inputs and outputs of the base timer circuit blocks. For example, in the cross-trigger matrix, trigger outputs from a first timer circuit block are selectively coupled to trigger inputs of the one or more timer circuit blocks, and trigger outputs from the one or more timer circuit blocks are selectively coupled to trigger inputs of the first timer circuit block. The cross-trigger matrix enables each timer circuit block to trigger another timer circuit block.

In some examples, to provide fault trigger signals to the one or more timer circuit blocks, the fault trigger outputs and fault trigger inputs associated with the first timer circuit block may be selectively coupled in a fault cross-trigger matrix with the one or more timer circuit blocks in a similar manner as described above with respect to the cross-trigger matrix. The fault cross-trigger matrix enables a device fault signal to be communicated to all of the stacked timer circuit blocks.

In some examples, the timer circuit block comprises a base timer having a basic configuration such as a counter and two capture-compare blocks. The stackable timer circuit blocks may be stacked (or combined) to form a larger timer as needed by the design requirements. Advantageously, the stackable timer circuit blocks enable efficient use of SoC resources by enabling the designer to stack base timers to build a timer of the required size.

In some examples, each of the stacked timer circuit blocks may be functionally equivalent as they use the same configuration (e.g., a counter and two capture-compare blocks.). As a result, even though there may be many instances of the stacked timer circuit blocks in a SoC, during verification, only a single configuration of the timer circuit blocks may need to be verified.

The cross-trigger matrix and the fault-trigger matrix may be selectively coupled into the desired configurations using software, hardware, or a combination of software and hardware in order to stack the base timer circuit blocks together to function as a single timer. For example, the cross-trigger matrix and the fault-trigger matrix may be defined by programmable instructions using software configuration tools like Verilog to design the high-level circuit representations of the stacked timer in register-transfer level (RTL) code. For example, the RTL code defines, via program instructions, how the base timer circuit blocks are selectively coupled together into the stacked timer. The RTL code may then be converted to a gate-level description of the circuit by a logic synthesis tool, and the synthesis results are then used by placement and routing tools to create the physical layout of the stacked timer. In addition to the programmable instructions defining the cross-trigger matrix and the fault-trigger matrix of the stacked timer, the programmable instructions may also define which of the base timer circuit blocks functions as the primary timer and which base timer circuit blocks function as the secondary timer. Furthermore, the programmable instructions may define which of the base timer circuit blocks respond to a device fault signal.

Of course, these advantages are merely examples, and no advantage is required for any particular embodiment.

Examples of an SoC with a stackable timer are described with reference to the figures below. In that regard, FIG. 1 is a block diagram of an exemplary SoC 100 according to some aspects of the present disclosure. Many integrated circuit device applications require a variety of components to achieve the desired functionality. In some instances, the components of the integrated circuit device are combined into a SoC such as exemplary SoC 100.

For example, SoC 100 may comprise a variety of components, including direct memory access (DMA) 105, central processing unit (CPU) 110, bus control logic 115, flash memory 120, analog to digital converter (ADC) 125, input/output (I/O) control 130, and timer 135. DMA allows hardware subsystems to access flash memory 120. ADC 125 enables the conversion of an analog signal to a digital signal. SoC 100 may also include a digital to analog converter (not shown) to convert digital signals to analog signals. I/O control 130 may enable the transfer of data between a peripheral to SoC 100 and CPU 110. These are exemplary components, and SoC 100 may include additional components or fewer components than those depicted in FIG. 1.

Furthermore, SoC 100 may comprise a microprocessor or other suitable integrated circuit device that comprises a variety of components including timer circuits (or timer devices).

In many applications, SoCs (or microprocessors) need one or more timer circuits. For example, an application with pulse width modulation may need a timer circuit with two capture-compare channels. In another application with pulse width modulation, a timer circuit may be needed with eight capture-compare channels.

In SoC 100, timer 135 may represent a single timer, or timer 135 may represent multiple base timers according to some aspects of the present disclosure. Multiple base timer circuits may be stacked (or combined) to function as a single timer represented by timer 135 in FIG. 1. A base timer comprises a timer circuit with a basic level of functionality. According to aspects of the present disclosure, multiple base timer circuits may be stacked to yield a timer circuit of the desired functionality. For example, a base timer may comprise a timer circuit with two capture-compare circuits, and if the desired functionality requires eight capture-compare circuits, then timer 135 may represent four stacked base timer circuits with two capture-compare circuits each so that when stacked together the four timer circuits yield the desired functionality comprising eight capture-compare circuits in timer 135.

Additional timer circuits may be included in SoC 100 where each of the timer circuits may comprise the base timer circuit or stacked base timer circuits. By using a single base timer design, during test and verification of the circuit design, only one circuit needs to be verified as only one circuit design is used in the SoC 100—the base timer circuit.

Figure 2:
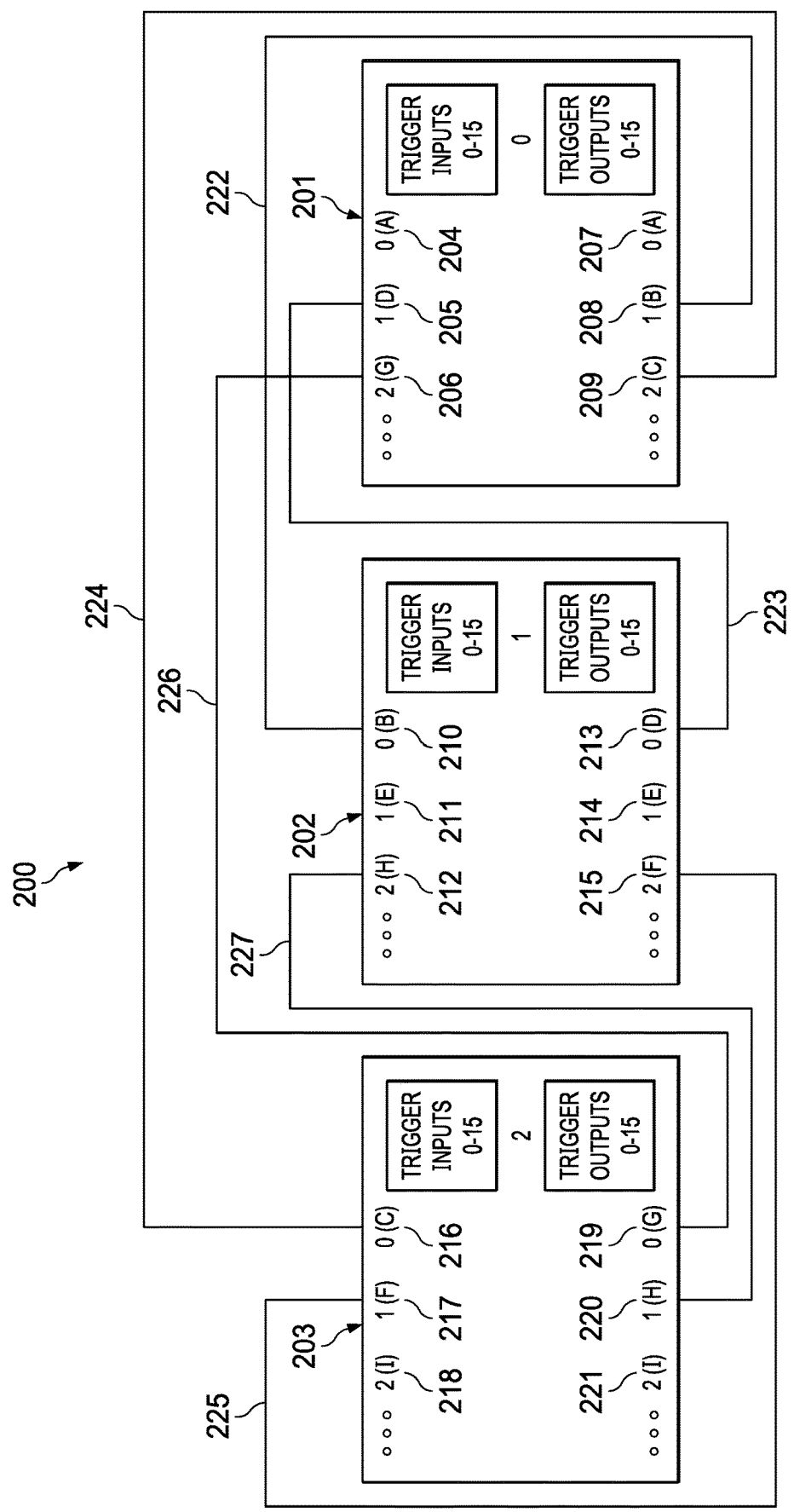
FIG. 2 is a diagram of a cross-trigger matrix in a timer circuit according to some aspects of the present disclosure.

Operation of the stackable timer device is further described with reference to FIGS. 2 and 3. FIG. 2 is a diagram of a cross-trigger matrix in a timer circuit 200 according to some aspects of the present disclosure. In FIG. 2, each of the connections is denoted by letter to better understand the depicted connections. For example, line 222 couples trigger input 210 on timer 202 labeled "B" with trigger output 208 on timer 201 also labeled "B".

FIG. 2 discloses, for example, three timers 201, 202, and 203 coupled with a cross-trigger matrix, each with sixteen trigger inputs (0-15) and sixteen trigger outputs (0-15). Timers 201, 202, and 203 may have more or less than sixteen trigger inputs and sixteen trigger outputs. Timers 201, 202, and 203 are merely exemplary and are not limiting. Moreover, as shown in FIG. 2, not all of the trigger inputs and trigger outputs need to be used. In the example in FIG. 2, while each of the timers has sixteen inputs and sixteen outputs, up to sixteen timer circuits may be stacked, but fewer than sixteen may be stacked as set forth in FIG. 2.

Furthermore, although timers 201, 202, and 203 in FIG. 2 each have sixteen trigger inputs and sixteen trigger outputs, the present disclosure is not limited to such a configuration. Exemplary timers, according to aspects of the present disclosure, having differing numbers of trigger inputs and trigger outputs may be coupled in a cross-trigger matrix. For example, a first timer with four trigger inputs and four trigger outputs may be coupled (or stacked) with a second timer with 64 trigger inputs and 64 trigger outputs. The smallest number of trigger inputs and trigger outputs of the stacked timer circuits may determine the total number of timer circuits that can be stacked together. For example, only two timer circuits may be stacked if the smallest timer (in terms of trigger inputs and trigger outputs) has two trigger inputs and two trigger outputs.

The depiction of three timers in FIG. 2 is not limiting. Timers 201, 202, and 203, for example, disclose the interconnection of three trigger inputs and three trigger outputs that may be coupled in a cross-trigger matrix as disclosed below.

Timers 201, 202, and 203 in FIG. 2 disclose sixteen trigger inputs and sixteen trigger outputs, but for clarity, because only (three) timers 201, 202, and 203 are stacked (or combined), then only three of the trigger inputs and trigger outputs are shown for each of the timers. With sixteen trigger inputs and sixteen trigger outputs, there could be up to sixteen timers stacked together. Base timers with fewer and more than sixteen trigger inputs and trigger outputs may be used. With larger numbers of trigger inputs and trigger outputs on the base timer circuit block, there is more flexibility in the number of base timers that can be combined. The exemplary configuration of FIG. 2 with timers 201, 202, and 203 is not intended to limit the present disclosure.

Referring to FIG. 2, timers 201, 202, and 203 each share the same functional features. For example, timers 201, 202, and 203 may each include the same base feature set of two capture-compare channels, one counter, and one fault input. Timers 201, 202, and 203 comprise the base timers that may be stacked (or combined) as disclosed herein to function as a single timer. In another embodiment, each base timer may have more or less features than those described here. For example, a base timer may include six capture-compare channels.

Referring to FIG. 2, timers 201, 202, and 203 are configured in a cross-trigger matrix. The couplings are set forth by the letters in FIG. 2. Trigger input 204 ("A") on timer 201 may be coupled to trigger output 207 ("A") on timer 201 as a feedback loop (not shown). Trigger input 205 ("D") on timer 201 may be coupled to trigger output 213 ("D") on timer 202. This is shown as coupling 223. Trigger input 206 ("G") on timer 201 may be coupled to trigger output 219 ("G") on timer 203. This is shown as coupling 226. Trigger input 210 ("B") on timer 202 may be coupled to trigger output 208 ("B") on timer 201. This is shown as coupling 222. Trigger input 211 ("E") on timer 202 may be coupled to trigger output 214 ("E") on timer 202 as a feedback loop (not shown). Trigger input 212 ("H") on timer 202 may be coupled to trigger output 220 ("H") on timer 203. This is shown as coupling 227. Trigger input 216 ("C") on timer 203 may be coupled to trigger output 209 ("C") on timer 201. This is shown as coupling 224. Trigger input 217 ("F") on timer 203 may be coupled to trigger output 215 ("F") on timer 202. This is shown as coupling 225. Trigger input 218 ("I") on timer 203 may be coupled to trigger output 221 ("I") on timer 203 as a feedback loop (not shown).

In another example, if only two timers 201 and 202 were configured in a cross-trigger matrix, then the couplings would be set forth as follows: Trigger input 204 on timer 201 may be coupled to trigger output 207 on timer 201 as a feedback loop. Trigger input 205 on timer 201 may be coupled to trigger output 213 on timer 202. Trigger input 210 on timer 202 may be coupled to trigger output 208 on timer 201. Trigger input 211 on timer 202 may be coupled to trigger output 214 on timer 202 as a feedback loop.

The cross-trigger matrix enables a base timer circuit block with trigger inputs and trigger outputs (described above) to be stacked with other base timer circuit blocks to form a stacked timer. Because each base timer circuit block has the same functional features, any of the stacked base timer circuit blocks may act as a primary timer for the stacked timer. User configuration of the stacked timer may be set forth in design software that enables the designer to choose which of the stacked timer circuit blocks is designated as the primary timer. In an embodiment, there is only one primary timer and the other timers in the stack are secondary to the primary timer. The primary timer may interface with the processor on the SoC or other functional blocks or peripherals to receive trigger signals to perform an action (such as start counting) whereas the secondary timer(s) interface with the primary timer to receive signals to perform an action.

In an example, the timer circuit in FIG. 2 may be started with a trigger signal (not shown) received by one of the timers 201, 202, and 203 that is designated as the primary timer. This trigger signal triggers the primary timer to start, and the primary timer communicates the trigger signal to the one or more secondary timers using the cross-trigger matrix disclosed in FIG. 2, which triggers the one or more secondary timers to start.

Figure 3:
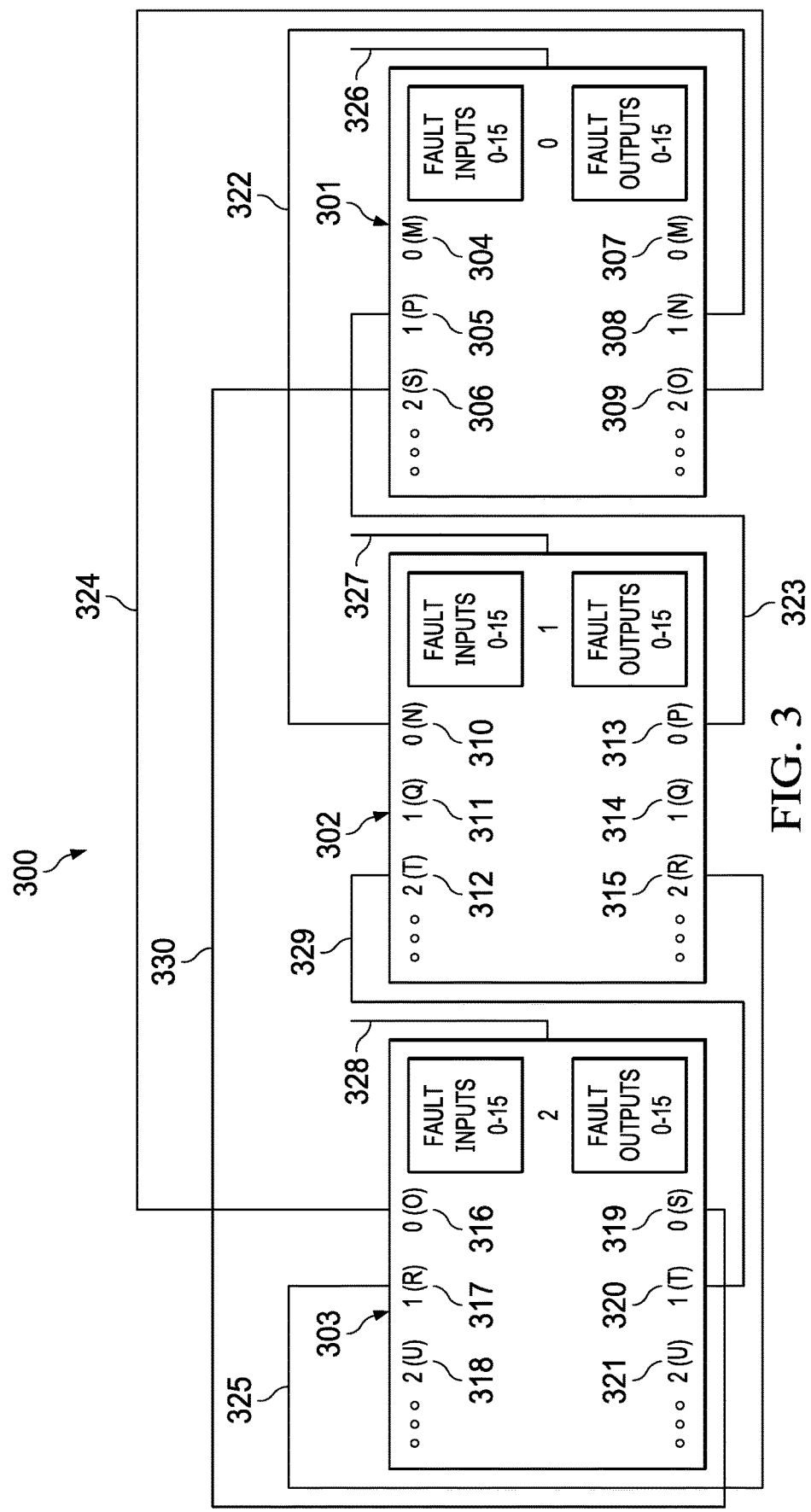
FIG. 3 is a diagram of a fault cross-trigger matrix in a timer circuit according to some aspects of the present disclosure.

FIG. 3 is a diagram of a fault cross-trigger matrix in a timer circuit 300 according to some aspects of the present disclosure. In addition to the trigger inputs and trigger outputs discussed above with respect to FIG. 2, the timers disclosed herein may also include fault trigger inputs and fault trigger outputs that are connected in a fault cross-trigger matrix.

In FIG. 3, each of the connections is denoted by letter to better understand the depicted connections. For example, line 322 couples fault trigger input 310 on timer 302 labeled "N" with fault trigger output 308 on timer 301 also labeled "N".

FIG. 3 discloses, for example, three timers 301, 302, and 303 coupled with a fault cross-trigger matrix, each with sixteen fault trigger inputs (0-15) and sixteen fault trigger outputs (0-15). Timers 301, 302, and 303 may have more or less than sixteen fault trigger inputs and sixteen fault trigger outputs. Timers 301, 302, and 303 are merely exemplary and are not limiting. Moreover, as shown in FIG. 3, not all of the fault trigger inputs and fault trigger outputs need to be used. In the example in FIG. 3, each of the timers has sixteen fault trigger inputs and sixteen fault trigger outputs, so up to sixteen timer circuits may be stacked. However, fewer than sixteen may be stacked as set forth in FIG. 3. And timers with more than sixteen fault trigger inputs and sixteen fault trigger outputs may be used such as a timer with 64 fault trigger inputs and 64 fault trigger outputs. The present disclosure is not limited to a number of fault trigger inputs and fault trigger outputs.

Exemplary timers, according to aspects of the present disclosure, having differing numbers of fault trigger inputs and fault trigger outputs may be coupled in a fault cross-trigger matrix. For example, a first timer with four fault trigger inputs and four fault trigger outputs may be coupled (or stacked) with a second timer with 64 fault trigger inputs and 64 fault trigger outputs. The smallest number of fault trigger inputs and fault trigger outputs of the stacked timer circuits may determine the total number of timer circuits that can be stacked together. For example, only two timer circuits may be stacked if the smallest timer (in terms of fault trigger inputs and fault trigger outputs) has two fault trigger inputs and two fault trigger outputs.

The number of fault trigger inputs and fault trigger outputs may correspond to the number of trigger inputs and trigger outputs. For example, FIG. 3 discloses sixteen fault trigger inputs and sixteen fault trigger outputs for each of timers 301, 302, and 303, which corresponds to the number trigger inputs and trigger outputs in timers 201, 202, and 203 of FIG. 2. The exemplary configuration of FIG. 3 illustrates the couplings of only three fault trigger inputs and three fault trigger outputs for each of timers 301, 302, and 303 consistent with the disclosure in FIG. 2. According to some aspects of the present invention and as discussed with regard to FIG. 2, the example in FIG. 3 may be expanded to include sixteen timers. However, timers with fewer fault trigger inputs and fault trigger outputs may be used, and timers with more than sixteen fault trigger inputs and sixteen fault trigger outputs may be used. The exemplary configuration of FIG. 3 with timers 301, 302, and 303 is not intended to limit the present disclosure.

The fault cross-trigger matrix in timer circuit 300 enables timers 301, 302, and 303 to communicate a device fault signal from the primary timer to each secondary timer. Each base timer circuit block, such as timers 301, 302, and 303 includes a device fault input pin that may be coupled, for example, to a device pin in SoC 100. Timer 301 includes device fault input pin 326. Timer 302 includes device fault input pin 327. Timer 303 includes device fault input pin 328. According to an embodiment, the device fault input pins 326, 327, and 328 may receive a device fault signal. In an example, each timer may receive a signal on the respective device fault input, but only the timer configured as the primary timer may be configured to respond to the device fault signal to trigger the secondary timers through the fault cross-trigger matrix. The secondary timers may be configured to ignore the device fault signal received on their respective device fault inputs. In another example, only the primary timer is coupled to the device pin to receive the device fault signal. When the primary timer receives the device fault signal, the primary timer triggers the secondary timers through the fault cross-trigger matrix in timer circuit 300. The primary timer may interface with the processor on the SoC or other functional blocks or peripherals to receive the device fault signal to perform an action (such as stop counting) whereas the secondary timer(s) interface with the primary timer to receive the device fault signal to perform an action.

With the fault cross-trigger matrix in timer circuit 300, timers 301, 302, and 303 function as a single stacked timer, and only a single device fault signal needs to be provided to stacked timers 301, 302, and 303 to control the stacked timers 301, 302, and 303 as a single timer.

For example, the device fault signal may indicate that the timer is to stop. In some embodiments, the device fault signal may indicate that the timer is to perform other functions that may be configured by the user through a software application.

Referring to FIG. 3, timers 301, 302, and 303 are configured in a fault cross-trigger matrix. The fault cross-trigger matrix couplings are set forth by the letters in FIG. 3. Fault trigger input 304 ("M") on timer 301 may be coupled to fault trigger output 307 ("M") on timer 301 as a feedback loop (not shown). Fault trigger input 305 ("P") on timer 301 may be coupled to fault trigger output 313 ("P") on timer 302. This is shown as coupling 323. Fault trigger input 306 ("S") on timer 201 may be coupled to fault trigger output 319 ("S") on timer 303. This is shown as coupling 330. Fault trigger input 310 ("N") on timer 302 may be coupled to fault trigger output 308 ("N") on timer 301. This is shown as coupling 322. Fault trigger input 311 ("Q") on timer 302 may be coupled to fault trigger output 314 ("Q") on timer 302 as a feedback loop (not shown). Fault trigger input 312 ("T") on timer 302 may be coupled to fault trigger output 320 ("T") on timer 303. This is shown as coupling 329. Fault trigger input 316 ("O") on timer 303 may be coupled to fault trigger output 309 ("O") on timer 301. This is shown as coupling 324. Fault trigger input 317 ("R") on timer 303 may be coupled to fault trigger output 315 ("R") on timer 302. This is shown as coupling 325. Fault trigger input 318 ("U") on timer 303 may be coupled to fault trigger output 321 ("U") on timer 303 as a feedback loop (not shown).

In another example, if only two timers 301 and 302 were configured in a fault cross-trigger matrix, then the couplings would be set forth as follows: Fault trigger input 304 on timer 301 may be coupled to fault trigger output 307 on timer 301 as a feedback loop. Fault trigger input 305 on timer 301 may be coupled to fault trigger output 313 on timer 302. Fault trigger input 310 on timer 302 may be coupled to fault trigger output 308 on timer 301. Fault trigger input 311 on timer 302 may be coupled to fault trigger output 314 on timer 302 as a feedback loop.

The fault cross-trigger matrix enables each timer to respond to a device fault signal. For example, the device fault signal may indicate that the timers are to stop, and the fault cross-trigger matrix enables all of the secondary timers to stop. Because each of the base timer circuit blocks are selectively coupled with the fault cross-trigger matrix, any of the base timer circuit blocks may be configured as the primary timer, depending on the user configuration. User configuration of the stacked (or combined) timer may be set forth in design software that enables the designer to choose which timer acts as the primary. In an embodiment, there is only one primary timer and the other timers in the stack are secondary to the primary timer. In an embodiment, a timer that is designated as the primary timer is the primary timer for both trigger signals disclosed with respect to FIG. 2 and device fault signals disclosed with respect to FIG. 3.

It is noted that the cross-trigger matrix and the fault cross-trigger matrix are independent of each other. For example, timers 201, 202, and 203 may be stacked as set forth in FIG. 2 without a corresponding fault cross-trigger matrix. Likewise, timers 301, 302, and 303 may be stacked as set forth in FIG. 3 without a corresponding cross-trigger matrix. In another example, timers 201, 202, and 203 may be stacked with the cross-trigger matrix of FIG. 2 and may also include a corresponding fault cross-trigger matrix as shown in FIG. 3. The configuration may be dependent on the application for the stacked timer. For example, in an application or SoC in which the stacked timer may not need to utilize the fault cross-trigger matrix, the fault cross-trigger matrix may not be configured. In another example, in an application or SoC in which the stacked timer may not utilize the cross-trigger matrix but utilize the fault cross-trigger matrix, then only the fault cross-trigger matrix may be configured. The specific configuration for each stacked timer may, for example, by performed via instructions in software, hardware, or a combination of hardware and software instructions.

Figure 4:
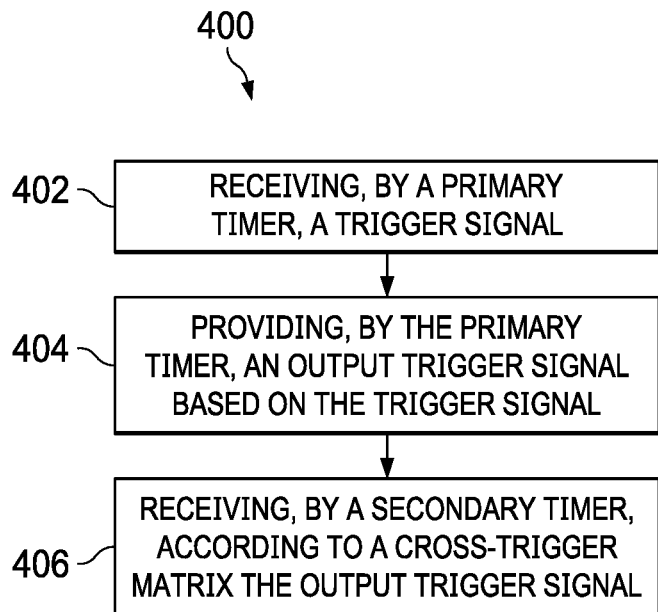
FIG. 4 is a flow diagram of a method 400 of triggering stacked timer circuits according to some aspects of the present disclosure.

FIG. 4 is a flow diagram of a method 400 of triggering stacked timer circuits (or timer devices) according to some aspects of the present disclosure. The method 400 is suitable for performing by the timer circuits of FIGS. 2-3 or other suitable integrated circuit. Processes of the method 400 may be performed in orders other than described, and processes may be performed concurrently in parallel. Furthermore, processes of the method 400 may be omitted or substituted in some examples of the present disclosure.

Referring to block 402, the primary timer receives a trigger signal. The trigger signal, for example, may start the stacked timer. In the example in which timer 201 may be the primary timer, timer 201 receives the trigger signal.

Referring to block 404, the primary timer provides an output trigger signal based on the trigger signal. In the example in which timer 201 is the primary timer, the output trigger signals are provided on trigger outputs 207, 208, and 209. The output trigger signals may be configured to trigger the secondary timers such that they are triggered synchronously with the master timer. In other applications, the secondary timers may be triggered sequentially from the primary timer.

Referring to block 406, each secondary timer may receive the output trigger signals using the cross-trigger matrix discussed above with respect to FIG. 2. As set forth above with respect to FIG. 2, each secondary timer is coupled together along with the primary timer in a cross-trigger matrix. For example, if timer 201 is the primary timer and timers 202 and 203 are secondary timers, secondary timers 202 and 203 receive the output trigger signal from primary timer 201. In this example, timer 202 receives the output trigger signal on trigger input 210 that is coupled to trigger output 208 of timer 201. Timer 203 receives the output trigger signal on trigger input 216 that is coupled to trigger output 209 of timer 201.

Furthermore, each of the secondary timers output to the primary timer over the cross-trigger matrix. In the example in which timer 201 is the primary timer, then timer 201 receives the output from secondary timers 202 and 203. By having the output from the secondary timers 202 and 203 received by primary timer 201, primary timer 201 may provide an output to the processor 110 of the SoC 100 or other elements that interface with the stacked timer. Thus, the stacked timers appear because of the cross-trigger matrix as a single timer device rather than a group of timer devices.

Figure 5:
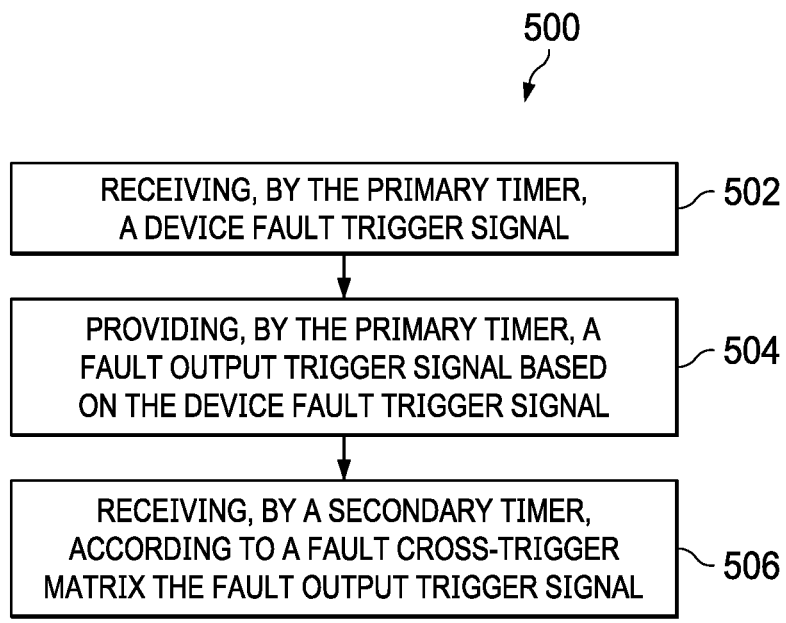
FIG. 5 is a flow diagram of a method 500 of fault triggering stacked timer circuits according to some aspects of the present disclosure.

FIG. 5 is a flow diagram of a method 500 of fault triggering stacked timer circuits (or timer devices) according to some aspects of the present disclosure. The method 500 is suitable for performing by the timer circuits of FIGS. 2-3 or other suitable integrated circuit. Processes of the method 500 may be performed in orders other than described, and processes may be performed concurrently in parallel. Furthermore, processes of the method 500 may be omitted or substituted in some examples of the present disclosure.

Referring to block 502, the primary timer receives a device fault trigger signal. The device fault trigger signal may cause a fault condition on the primary timer and one or more secondary timers. A fault condition may indicate that the timers 301, 302, and 303 are to stop. In an embodiment, the device fault trigger signal may indicate an operation other than stopping the timers. In an example in which timer 301 is the primary timer, the device fault trigger signal may be received at the timer device fault input 326. In an embodiment, a device fault trigger signal may also be received at the timer device fault input pins 327 and 328 of the secondary timers 302 and 303, but the secondary timers may not respond to the device fault trigger signal received on the respective device fault inputs of the secondary timers.

Referring to block 504, upon receiving the device fault trigger signal at the primary timer, the primary timer provides a fault output trigger signal to the one or more secondary timers that are based on the received device fault trigger signal. In the example in which timer 301 is the primary timer, the fault output trigger signal is provided by fault trigger outputs 307, 308, and 309. The fault output trigger signals may be configured to trigger the secondary timers such that they are triggered synchronously with the master trigger.

Other fault trigger timing may also be implemented. The stacked timer may be configured to select which device fault input pins will be responded to by the stacked timer. In the above example, the stacked timer may be programmed to respond to a device fault trigger signal received on device fault input 327 of secondary timer 302 instead of primary timer 301. The fault cross-trigger matrix enables each of the base timer blocks to receive the device fault trigger signal.

Referring to block 506, the primary timer and each secondary timer receives the fault output trigger signals using the fault cross-trigger matrix. As set forth above with respect to FIG. 3, each secondary timer is coupled together along with the primary timer in a fault cross-trigger matrix. For example, if timer 301 is the primary timer and timers 302 and 303 are secondary timers, secondary timers 302 and 303 receive the fault output trigger signal from primary timer 301. In this example, secondary timer 302 receives the fault output trigger signal on fault trigger input 310 that is coupled to fault trigger output 308 of timer 301. Timer 303 receives the fault output trigger signal on fault trigger input 316 that is coupled to fault trigger output 309 of timer 301.

In an example, upon receiving the device fault trigger signal, a fault condition on the primary timer is determined based on the device fault trigger signal. For example, if the device fault trigger signal is high, the device fault trigger signal may indicate a fault condition, and upon receiving the device fault trigger signal, the primary timer may respond to the fault condition by, for example, stopping. The secondary timers are triggered by the fault output trigger signal from the primary timer. The secondary timers receive the fault output trigger signal from the primary timer through the fault cross-trigger matrix. In the example in which timer 301 is the primary timer, timer 301 triggers the fault condition in timers 302 and 303 synchronously with timer 301. Thus, timers 301, 302, and 303 function as a single timer to SoC 100, and a device fault trigger signal may cause timers 301, 302, and 303 to stop synchronously. Timing, other than synchronous timing, with the response of the secondary timers may be implemented.

The SoC 100 or other integrated circuit device may perform the processes of the methods 400 and 500 using any combination of dedicated hardware and instructions stored in a non-transitory medium. Accordingly, elements of the SoC 100 may include a processing resource coupled to a non-transitory computer-readable medium. The processing resource may include one or more microcontrollers, ASICs, CPUs, GPUs, and/or other processing resources configured to execute instructions stored on the medium. Examples of suitable non-transitory computer-readable media include one or more flash memory devices, battery-backed RAM, SSDs, HDDs, optical media, and/or other memory devices suitable for storing the instructions for the processing resource. For example, at least one non-transitory computer readable medium may include instructions that stack a plurality of timer circuit blocks on a system-on-a-chip. The instructions when executed may perform the processes of the methods 400 and 500 to configure a cross-trigger matrix and a fault cross-trigger matrix that couples the plurality of timer circuit blocks as described above with respect to FIGS. 2-5.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

It is understood that the present disclosure provides a number of exemplary embodiments and that modification are possible to these embodiments. Such modifications are expressly within the scope of this disclosure. Furthermore, application of these teachings to other environments, applications, and/or purposes is consistent with and contemplated by the present disclosure.

What is claimed is:

1. A system-on-a-chip ("SoC") comprising:
 a processor; and
 a plurality of timer circuit blocks including at least a first timer circuit block and a second timer circuit block;
 wherein each of the plurality of timer circuit blocks is selectively coupled by at least one of a first programmable matrix and a second programmable matrix;
 wherein the first programmable matrix is configured to couple a second trigger input of the first timer circuit block with a first trigger output of the second timer circuit block; and
 wherein the second programmable matrix is configured to couple a second fault input of the first timer circuit block with a first fault output of the second timer circuit block.

2. The SoC of claim 1, wherein:
 each of the plurality of timer circuit blocks includes:
 a counter;
 a first capture-compare block configured to receive and store a first value and compare the first value to a first control value; and
 a second capture-compare block configured to receive and store a second value and compare the second value to a second control value.

3. The SoC of claim 1, wherein:
 each of the plurality of timer circuit blocks comprises a hard intellectual property circuit block.

4. The SoC of claim 1, wherein:
 the first programmable matrix is configured to couple a first trigger input of the second timer circuit block with a second trigger output of the first timer circuit block; and
 the second programmable matrix is configured to couple a first fault input of the second timer circuit block with a second fault output of the first timer circuit block.

5. The SoC claim 4, wherein:
 the plurality of timer circuit blocks includes a third timer circuit block;
 the first programmable matrix is configured to couple a third trigger output of the second timer circuit block with a second trigger input of the third timer circuit block; and
 the second programmable matrix is configured to couple a third fault output of the second timer circuit block with a second fault input of the third timer circuit block.

6. The SoC of claim 5, wherein:
 the first programmable matrix is configured to couple a third trigger output of the first timer circuit block with a first trigger input of the third timer circuit block; and
 the second programmable matrix is configured to couple a third fault output of the first timer circuit block with a first fault input of the third timer circuit block.

7. The SoC of claim 6, wherein:
 the first programmable matrix is configured to couple a third trigger input of the first timer circuit block with a first trigger output of the third timer circuit block; and
 the second programmable matrix is configured to couple a third fault input of the first timer circuit block with a first fault output of the third timer circuit block.

8. The SoC of claim 7, wherein:
the first programmable matrix is configured to couple a third trigger input of the second timer circuit block with a second trigger output of the third timer circuit block; and
the second programmable matrix is configured to couple a third fault input of the second timer circuit block with a second fault output of the third timer circuit block.

9. The SoC of claim 1, wherein:
the first programmable matrix and the second programmable matrix are configured to enable at least two of the plurality of timer circuit blocks to function as a single timer.

10. The SoC of claim 1, wherein:
the second programmable matrix is configured to provide a device fault signal to one or more of the plurality of timer circuit blocks configured to respond to the device fault signal.

11. The SoC of claim 1, wherein:
one of the plurality of timer circuit blocks is configured as a primary timer, wherein the primary timer is configured to communicate with the processor; and
the plurality of timer circuit blocks other than the primary timer that are selectively coupled to the primary timer by the first programmable matrix or the second programmable matrix are configured as secondary timers to the primary timer.

12. The SoC of claim 11, wherein:
the primary timer is configured to receive a device fault signal; and
the primary timer is configured to trigger a fault condition on the secondary timers based on the device fault signal.

13. An integrated circuit comprising:
a first timer device that includes:
    a first plurality of trigger inputs;
    a first plurality of trigger outputs;
    a first plurality of fault trigger inputs; and
    a first plurality of fault trigger outputs;
a second timer device that includes:
    a second plurality of trigger inputs;
    a second plurality of trigger outputs;
    a second plurality of fault trigger inputs; and
    a second plurality of fault trigger outputs;
wherein a trigger output of the first plurality of trigger outputs is coupled to a trigger input of the second plurality of trigger inputs;
wherein a trigger output of the second plurality of trigger outputs is coupled to a trigger input of the first plurality of trigger inputs;
wherein a fault trigger output of the first plurality of fault trigger outputs is coupled to a fault trigger input of the second plurality of fault trigger inputs; and
wherein a fault trigger output of the second plurality of fault trigger outputs is coupled to a fault trigger input of the first plurality of fault trigger inputs.

14. The integrated circuit of claim 13, wherein the first timer device triggers the second timer device.

15. The integrated circuit of claim 13, wherein the first timer device further includes:
a first timer device fault input.

16. The integrated circuit of claim 13, wherein the second timer device further includes:
a second timer device fault input.

17. At least one non-transitory computer readable medium including instructions that stack a first timer circuit block with a second timer circuit block on a system-on-a-chip, the instructions when executed:
configure a first matrix to:
    couple a second of a plurality of trigger inputs of a first timer circuit block with a first of a plurality of trigger outputs of a second timer circuit block; and
    couple a first of the plurality of trigger inputs of the second timer circuit block with a second of the plurality of trigger outputs of the first timer circuit block; and
configure a second matrix to:
    couple a second of a plurality of fault inputs of the first timer circuit block with a first of a plurality of fault outputs of the second timer circuit block; and
    couple a first of the plurality of fault inputs of the second timer circuit block with a second of the fault outputs of the first timer circuit block.

18. The at least one non-transitory computer readable medium of claim 17, wherein:
the first timer circuit and the second timer circuit include:
    a counter;
    a first capture-compare circuit configured to receive and store a first value and compare the first value to a first control value; and
    a second capture-compare circuit configured to receive and store a second value and compare the second value to a second control value.

19. The at least one non-transitory computer readable medium of claim 17, wherein:
the first timer circuit includes a first device fault input pin; and
    the first timer circuit is configured as a primary timer circuit, wherein the first timer circuit is configured to respond to a device fault signal received on the first device fault input pin.

20. The at least one non-transitory computer readable medium of claim 19, wherein:
the second timer circuit includes a second device fault input pin; and
    the second timer circuit is configured as a secondary timer circuit, wherein the second timer circuit is configured to ignore a device fault signal received on the second device fault input pin.

* * * * *